May 19, 1931.  W. A. CHRYST  1,806,333
SHOCK ABSORBER
Filed Feb. 4, 1929   2 Sheets-Sheet 1
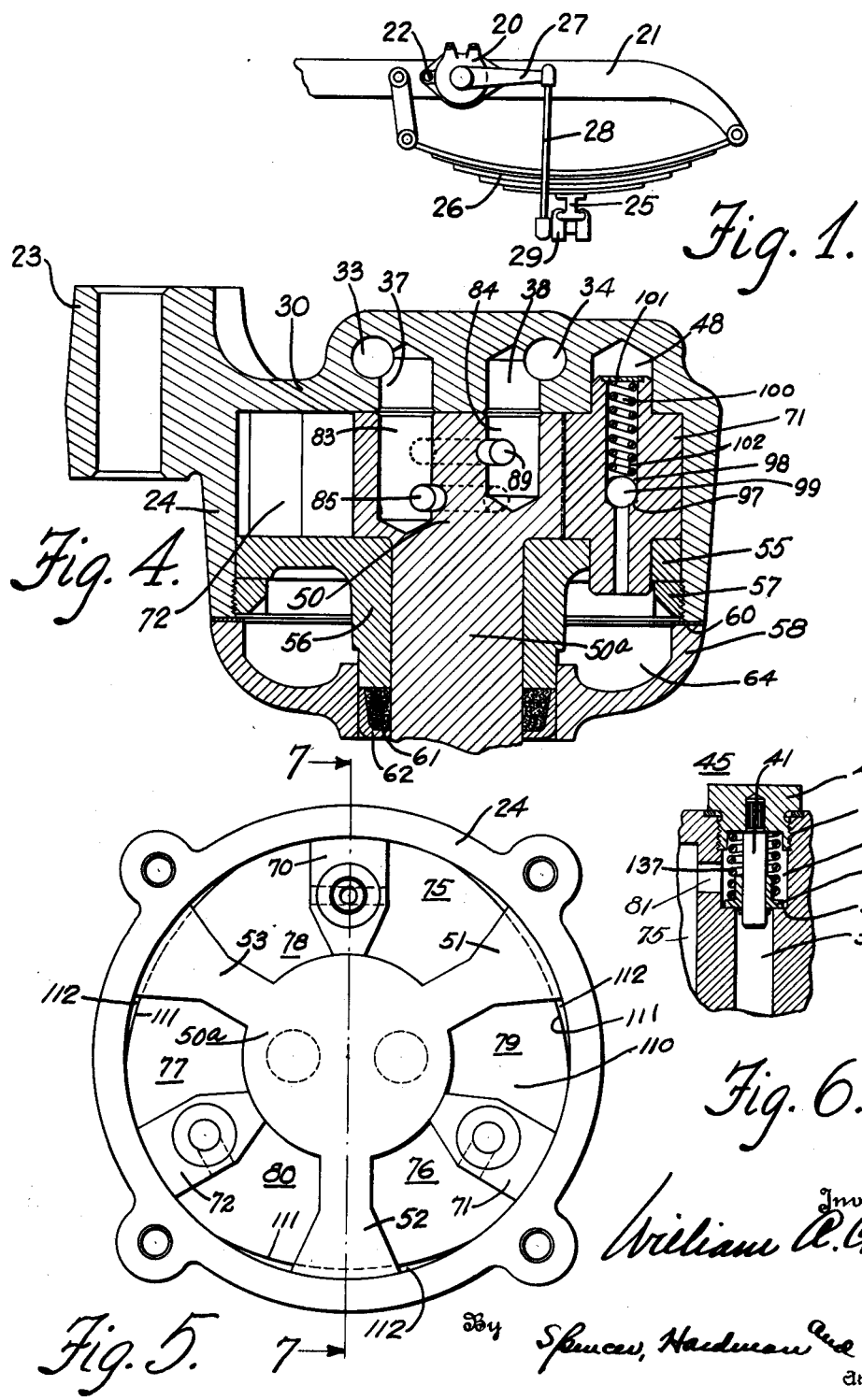

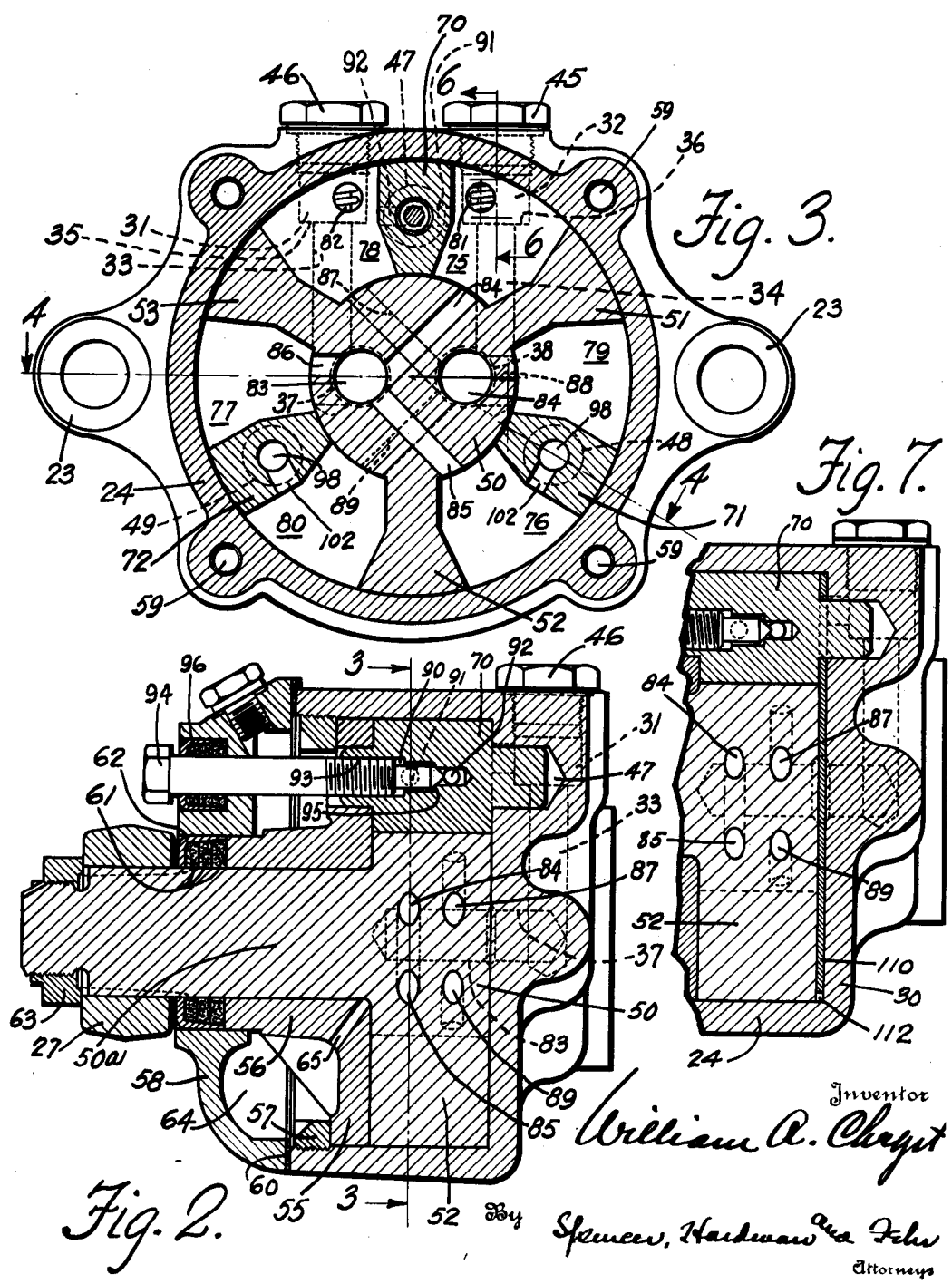

Patented May 19, 1931

1,806,333

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed February 4, 1929. Serial No. 337,190.

This invention relates to improvements in shock absorbers particularly adapted to control the movement of two relatively movable members, for instance the frame and axle of a vehicle.

It is among the objects of the present invention to provide a shock absorber adapted to control the approaching and separating movements of the frame and axle of a vehicle by resisting the compression and rebounding movements of the vehicle springs which support the frame upon the axle, said spring movements if not restrained, resulting in uncomfortable shocks and jolts being transmitted to the body of the vehicle.

Another object of the present invention is to provide a hydraulic shock absorber so constructed and arranged that the fluid pressures therein are distributed over comparatively large areas, thus substantially reducing the possibility of fractures.

Further objects and advantages of the present invention will be apparent from the following description, reference being had to the accompanying drawings wherein a preferred embodiment of one form of the present invention is clearly shown.

In the drawings:

Fig. 1 illustrates a front portion of the frame of a vehicle supported by springs upon the usual axle, the shock absorber embodying the present invention being shown applied thereto.

Fig. 2 is a cross sectional view taken vertically through the axis of the shock absorber.

Fig. 3 is a view taken along the line 3—3 of Fig. 2.

Fig. 4 is a sectional view taken along the line 4—4 of Fig. 3.

Fig. 5 is a view of a modified form of the shock absorber, this view being taken from the front end with the cover and bearing plate removed.

Fig. 6 is a fragmentary detail section taken along the line 6—6 of Fig. 3, showing one of the check valves of the device.

Fig. 7 is a fragmentary sectional view taken along the line 7—7 of Fig. 5, and similar to Fig. 2, showing the modified form of the shock absorber.

Referring to the drawings, the shock absorber as a whole is designated by the numeral 20, said shock absorber being secured to the vehicle frame 21 by bolts or studs 22 extending through the apertured bosses 23 formed on the casing 24 of the shock absorber.

Frame 21 is supported on the axle 25 by springs 26, one of which is shown in the Fig. 1. The shock absorber 20 has an operating arm 27, the free end of which is swivelly connected to one end of the connecting link 28, the other end of said link being swivelly connected to a bracket 29 attached to the axle 25.

The shock absorber 20 comprises a cylindrical casing 24, closed at one end by the end wall 30, the other end being open. As shown in the Figs. 2 and 4, the end wall 30 has portions of increased thickness providing for fluid conduits and valve chambers. The valve chambers designated by the numerals 31 and 32 in the Fig. 3 communicate with smaller channels 33 and 34 respectively formed in the end wall 30 of the casing. The channels 33 and 34 being smaller than the respective valve chambers 31 and 32, provide a shoulder in each valve chamber forming valve seats 35 and 36 respectively in chambers 31 and 32. The channels 33 and 34 each have a communicating channel 37 and 38 respectively which lead from channels 33 and 34 respectively into the interior of the casing 24. The Fig. 6, which is a detailed fragmentary view taken along the line 6—6 of Fig. 3, clearly illustrates the type of check valve with which the valve chambers 31 and 32 are provided. The outer end of each of the valve chambers 31 and 32 has interior screw threads 39 for receiving the screw plug 40 of the check valve. Screw plug 40 axially supports a valve pin 41 which extends through the valve chamber 32 partly into the respective channel as shown in Fig. 6, the pin 41 being of comparatively smaller diameter than said channel. A valve 42 is slidably supported on the pin 41 and is urged into yieldable engagement with the valve seat by a spring 137. At the end of the pin 41 there is provided any suitable means for preventing the valve 42 from sliding off the pin when the check valve, a unitary structure, is removed from the shock absorber.

For purposes of assisting in the description of this device, the check valve within the valve chamber 32 will be described as a whole by the numeral 45, and the check valve within the chamber 31 by the numeral 46. The end wall 30 of the casing 24 is also provided with three recesses 47, 48 and 49 spaced substantially 120° apart and equidistant from the axis of the casing.

A piston 50 is rotatably supported within the cylindrical casing, said piston comprising a central shaft or hub portion 50a, the inner end of which has radially arranged vanes 51, 52 and 53 spaced substantially 120° apart, said vanes dividing the cylindrical casing into three compartments. In Figs. 3 and 5 it may be seen that the outer arcuate face of the vanes 51, 52 and 53 slidably engage the inner wall of the casing 24 so that this end of the piston finds a bearing within the casing. A circular disc or plate 55 fits into the casing 24, said plate or disc having a cylindrical extension 56 forming a bearing in which the outer end of the shaft 50a is journalled. The inner surface of the plate engages one edge of the vanes 51, 52 and 53, the opposite edge of these vanes engaging the inner surface of the end wall 30 of the casing, thus the disc or plate 55 forms one wall of the compartments between the vanes of the piston. A clamping ring 57 is screw-threaded into the outer end of the casing 24, said clamping ring urging the disc or plate 55 against the vanes of the piston and maintaining said disc or plate 55 in proper position within the casing 24. A cup-shaped end cover 58 is secured to the outer edge of the casing 24 by a plurality of screws entering the screw-threaded apertures 59 of the casing, a gasket 60 being interposed between the end cover 58 and the outer edge of the casing. A central opening in the end cover 58 fits snugly over the end of the cylindrical extension 56, said opening in the end cover providing a recess in which is positioned a packing including packing elements 61 urged into sealing engagement with the shaft 50a and the end of the cylindrical extension 56 by the packing gland 62 which fits snugly into the opening in the end cover 58. The shaft 50a extending beyond the packing just described, has the shock absorber operating arm 27 attached thereto, a nut 63 substantially preventing removal of the arm from said shaft. The end cover 58 provides a fluid reservoir 64 termed the "compensating chamber" because from this chamber fluid is adapted to be introduced into the compartment to compensate for any losses by leakage or the like, the manner of introduction being described hereinafter. A passage 65 is provided in the disc or plate 55, said passage leading from the bearing surface between the said disc or plate and the piston whereby any fluid which may have a tendency to leak along the bearing surface between the shaft and the cylindrical extension 56 will be directed back into the fluid reservoir through this passage 65.

The compartments formed between the various vanes of the piston are respectively divided into two chambers by the partition members 70, 71 and 72. These partition members each have a lug extending from each end thereof, the lugs at one end fitting into respective openings or recesses 47, 48 or 49, in the end wall of the casing, properly locating the partitions within the compartment, the lugs extending from the opposite ends of the partition members fitting into respective recesses provided in the plate or disc 55. From the Figs. 3 and 5 it may be seen that the outer edges of these partition members fit snugly against the arcuate inner surface of the cylindrical casing 24, the other or inner edges of said partition members fitting slidably against the annular surface of the hub or shaft portion 50a of the piston. The various partition members thus provide a substantially leak-proof wall within each compartment, providing compression and rebound check chambers in each compartment, separated by a piston vane. The various compression check chambers which, as will be noted are alternate, are designated by the numerals 75, 76 and 77, while the compression rebound chambers are designated by the numerals 78, 79 and 80. The compression check chamber 75 is in communication with the valve chamber 32, on the relief side of the valve 42, by a duct 81. The rebound check chamber 78 is in communication with the valve chamber 31, on the relief side of its corresponding valve 42, through passage 82.

In the Figs. 2 and 3 the piston is shown having recesses 83 and 84 which extend longitudinally of the shaft or hub portion 50a of the piston and are spaced on opposite sides of the axis thereof. Recess 83 is in constant communication with the channel 33 leading to the pressure side of the check valve 46, while recess 84 is in constant communication with the pressure side of the check valve 45 through channel 34, the communication between these recesses and channels being maintained regradless of the position into which the piston is rotated. As shown in Fig. 3, the compression check chamber 75 is in communication with the recess 83 through passage 84 in the piston hub 50a. The compression check chamber 76 is connected with the recess 83 through passage 85 and the compression check chamber 77 communicates with recess 83 through passage 86, so that, all compression check chambers 75, 76 and 77 communicate with the recess 83 through the respective passages 84, 85 and 86. The respective rebound check chambers 78, 79 and 80 are all in communication with the recess 84 through the respective passages 87, 88 and 89 shown in dotted lines in Fig. 3.

From the aforegoing it may be seen that all of the compression check chambers 75, 76 and 77 communicate with the pressure side of check valve 46 through the passage 33, 37, recess 83 and channels 84, 85 and 86, said compression check chambers also being connected or in communication with the relief side of the check valve 45 through the duct 81. On the other hand all of the rebound check chambers 78, 79 and 80 are in communication with the pressure side of check-valve 45 through channels 34, 38, recess 84 and passages 87, 88 and 89, said rebound check chambers also communicating with the relief side of the check valve 46.

The partition 70 has a recess 90 opening at its front end and longitudinally thereof, a cross passage 91 providing communication between said recess and the compression check chamber 75, while another passage 92, out of the plane of passage 91, provides communication between the recess 90 and the rebound check chamber 78. Extending from the outside of the shock absorber into the recess 90 and screw-threaded thereinto as at 93, there is an adjustable metering pin 94, the tapered end of which cooperates with a seat 95 to control the fluid flow through the cross passages 91 and 92 between the chambers 75 and 78 in response to rotative movement of the piston 50. The adjustable metering pin 94 is provided with a packing 96 similar to the packing about the piston shaft 50a. The metering pin 94 is adjustable to vary the resistance of the shock absorber or to compensate for winter, at which time the viscosity of the fluid within the shock absorber may be substantially increased due to the lower temperatures.

Each of the partition members 71 and 72 as shown in Fig. 4, have a longitudinal passage 98, said passages each having portions of different diameters so as to provide a valve seat 97. In the larger diameter portion of the passage 98 there is provided a ball check valve 99 yieldably urged into engagement with the valve seat 97 by a spring 100. The smaller diameter portion of the duct 98 communicates with the fluid reservoir 64, while the larger diameter portion of said passage or duct 98 is closed at its end by the disc 101 which forms an abutment for one end of the spring 100. The larger diameter portions of these passages or ducts 98 communicate with the respective compression or rebound check chambers 76 and 80 through cross passages 102 as shown in the Fig. 3.

The operation of the device is as follows:
When the road wheels of the vehicle supported on the axle 25, but not shown on the drawings, strike an obstruction in the roadway, springs 26 are flexed or compressed toward the frame 21, thus the link 28 will operate the arm 27 in a counter-clockwise direction resulting in a counter-clockwise rotation of the piston vanes 51, 52 and 53. Fluid within the compression check chambers 75, 76 and 77 will have pressure exerted thereupon, the pressures within these various compression check chambers being equal, due to the fact that these chambers are inter-connected by channels 84, 85 and 86 leading to recess 83. The pressure in the compression check chambers 75 will assist the spring 137 of the valve 45 tightly to close said check valve 45 against transmission of fluid. Pressure from the various compression check chambers will be directed through the recess 83 and channels 37 and 33 against the pressure side of the check valve 46, said pressure when reaching a proper value forcing the valve 42 of the check valve 46 from its seat and thus establishing a flow of fluid from the compression check chambers into the rebound check chambers through the duct 82 into the chamber 78 and thence to the other rebound check chambers, due to the fact that they are inter-connected. If the metering pin 94 is adjusted to provide a clearance between it and its seat 95, then a restricted flow of fluid is established from the compression check chamber 75 into the rebound chamber 78 through passages 91 and 92 as soon as the counter-clockwise rotation of the piston exerts pressure upon the fluid with the compression check chambers.

As soon as the springs 26 have reached the limit of their compression flexure, the tendency of said springs is to return to normal position with a sudden rebounding movement which, if permitted, results in uncomfortable and undesirable jolts and jars being transmitted to the vehicle body. This device, however, immediately holds the spring 26 against the sudden return. As soon as the spring 26 begins to move in its return or rebound direction, the link 28 will move the operating arm 27 in a clockwise direction, resulting in a clockwise movement of the piston vanes 51, 52 and 53, thus the fluid within the rebound chambers 78, 79 and 80 will have pressure exerted thereupon, the fluid from these chambers being forced at a restricted flow through the closed passages 92 and 91 if, as has been mentioned before, the metering pin 94 is spaced from the seat 95. Sufficient fluid pressure within the chambers 78, 79 and 80 if exerted upon the pressure side of the valve 42 of check valve 45 through channels 87, 88 and 89 leading to recess 84 which is in communication with passages 38 and 34, will lift said valve against the effect of its spring 137 and thus will be established a flow of fluid from the rebound check chambers 78, 79 and 80 into the compression chambers 75, 76 and 77 through the duct 81 and the inter-connecting ducts 84, 85 and 86.

From this it may be seen that the compression side of the valve 45 is connected with rebound check chambers 78, 79 and 80 while its relief side is in communication with compression check chambers 75, 76 and 77, while on the other hand the compression side of check valve 46 is in communication with the compression check chambers 75, 76 and 77 and the relief side of said valve 46 connects with all of the rebound check chambers 78, 79 and 80.

If for any reason there is a leak of the fluid from the various compression check or rebound check members, such a loss of fluid is compensated for and the supply in said chambers is replenished by a flow of fluid from chamber 64 through the replenishing valves 99 in each partition member 71 and 72, one replenishing valve feeding a compression check chamber, the other replenishing valve feeding a rebound check chamber. The replenishing valves function to establish a flow of fluid from the fluid reservoir 64 into either one of these chambers when the piston is operating on the suction stroke, that is, if the piston is operating to exert pressure upon the fluid in the rebound check chambers, then the replenishing valve of the compression check chamber may function to replenish any fluid loss, and vice versa.

In order to further control or vary the resisting qualities of the device, an additional, controlled flow of fluid between the various compression check and rebound check chambers may be provided by a metering plate 110, which, as shown in Figs. 5 and 7, fits into the casing against the inner surface of the end wall 30, said metering plate being apertured to permit the lugs of the partition to pass therethrough, and thus the metering plate is properly located. As may be seen in the Fig. 5, between each of the partitions 70, 71 and 72 the outer peripheral edge 111 of the plate 110 recedes from the annular inner surface of the casing 24, this recession beginning a short distance on each side of the partition and gradually increasing as the intermediate point between said partitions is approached. Thus a space 112 is provided between the peripheral edge of the plate 110 and the other annular surface of the casing 24 between each two adjacent partitions, said space being variable. This plate is positioned between the piston vanes 51, 52 and 53 and the inner surface of the end wall 30 so that as the fluid within the various compression check or rebound check chambers has pressure exerted thereon, a restricted flow of fluid will be established from one of said chambers to the opposite adjacent chamber through the inter-connecting channel or space 112. For instance as the piston vane 51 moves from its intermediate position shown in Fig. 5 toward the partition 70 on the compression check stroke, fluid within the compression check chamber 75 will have a pressure exerted thereupon, said fluid flowing through the space 112 into the next adjacent rebound check chamber 79. As the piston 51 moves toward the partition 70, the entrance from the compression check chamber 75 into the space 112 will gradually be decreased and thus restriction to the flow of fluid from chamber 75 through space 112 into chamber 79 will correspondingly be increased, the resistance to the piston movement consequently being increased. Upon the reverse movement of the piston vane 51 from the position adjacent the partition 70, in which position it will have been moved by the compression of the vehicle spring 26, the first return movement of said vane from said position will cause the flow of fluid from the chamber 79 to the chamber 75 to be substantially highly restricted due to the fact that the piston 51 is positioned over the narrow end of space 112, said restriction being gradually decreased, however, as the piston vane 51 approaches its intermediate position as shown in Fig. 5. This same restriction occurs if the piston vane 51 moves toward the partition 71 and of course it will be understood that the same effect of fluid restriction is obtained in each compartment including compression check and rebound check chambers.

The present device in providing three vanes and three partitions forming three inter-connecting compression check chambers and three inter-connecting rebound check chambers provides an expansive area over which fluid pressures are distributed; thus the possibility of fractures are substantially reduced inasmuch as the substantially high fluid pressure at which shock absorbers operate is not concentrated within a small area.

The device may easily be adjusted to change resisting qualities and check valves may be replaced with very little trouble and no loss of fluid.

The device is compact and still sufficiently large to offer enough resistance to control the spring action of a comparatively heavy vehicle.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a cylinder; a piston reciprocable in said cylinder, dividing it into two compartments; a fluid flow controlling means adapted to establish a flow of fluid from one compartment to the other in response to the movement of the piston in one direction only; and a second fluid flow controlling means adapted to establish a flow of fluid from the said other compartment to the first mentioned compartment in response to the movement of the piston in the other direction.

2. A shock absorber comprising, in combination, a casing providing a cylinder; a piston reciprocable in said cylinder, and dividing it into two compartments; and oppositely acting one-way valves interposed between said compartments, one valve acting to establish a flow of fluid in one direction between said compartments when the piston is operated in one direction, the other valve acting to establish a flow of fluid in the opposite direction between said compartments when the piston is being operated in the opposite direction.

3. A shock absorber comprising, in combination, a casing providing a cylinder; a piston reciprocable in said cylinder and dividing it into two compartments; valve chambers in said casing; a check valve in each valve chamber; a duct connecting each respective compartment with the relief side of a respective check valve; and passages in the piston separately connecting each compartment with the pressure side of the check valve relieving into the relative compartment.

4. A shock absorber comprising, in combination, a casing providing a cylinder; a piston reciprocable in said cylinder and dividing it into two compartments; valve chambers in said casing; a spring actuated one-way valve in each of said chambers; ducts in the casing connecting each compartment with the relief side of a respective valve chamber; conduits in the piston in constant communication with the pressure side of the respective valve chambers; and channels in the piston, separately connecting each conduit with the respective compartment connected to the relief side of the opposite valve chamber.

5. A shock absorber comprising, in combination, a casing providing a cylinder; a piston reciprocable in said cylinder and dividing it into two compartments; two valve chambers; a check valve in each chamber; ducts connecting each cylinder compartment with the relief side of a respective valve chamber; and separate ducts in the piston providing constant communication between one cylinder compartment and the pressure side of the valve chamber whose relief side is connected with the adjacent cylinder compartment.

6. A shock absorber comprising, in combination, a casing; a stationary partition within said casing; pistons within the casing providing a compression chamber on each side of the partition; an intermediate member connecting the two pistons; a check valve for each compression chamber; means connecting the relief side of each check-valve with its respective compression chamber; and means connecting the pressure side of each check-valve with the adjacent compression chamber.

7. A shock absorber comprising, in combination, a casing; a stationary partition within said casing; pistons within the casing providing a compression chamber on each side of the partition; an intermediate member connecting the two pistons; a check-valve for each compression chamber; means connecting the relief side of each check-valve with its respective compression chamber; and means provided by the said intermediate member for connecting the pressure side of each check-valve with the adjacent compression chamber.

8. A shock absorber comprising, in combination, a casing; a stationary partition within said casing; pistons within the casing providing a compression chamber on each side of the partition; an intermediate member connecting the two pistons; a check valve for each compression chamber; means constantly connecting the relief side of each check valve with its respective compression chamber; and means constantly connecting the pressure side of each check-valve with the adjacent compression chamber.

9. A shock absorber comprising, in combination, a casing; a stationary partition within said casing; pistons within the casing providing a compression chamber on each side of the partition; an intermediate member connecting the two pistons; a check-valve for each compression chamber; means connecting the relief side of each check-valve with its respective compression chamber; means connecting the pressure side of each check valve with the adjacent compression chamber; a duct in the partition connecting the compression chambers; and adjustable means for varying the fluid flow capacity of each duct.

10. A shock absorber comprising, in combination, a casing; a stationary partition within said casing; pistons within the casing providing a compression chamber on each side of the partition; an intermediate member connecting the two pistons; a check-valve for each compression chamber; means connecting the relief side of each check-valve with its respective compression chamber; means connecting the pressure side of each check-valve with the adjacent compression chamber; and means within said casing for establishing a restricted flow of fluid from one or the other compression chamber in response to the movement of the respective pistons toward the partition.

11. In a device of the character described, the combination with a casing providing a cylinder; a piston within said cylinder dividing it into three compartments; stationary partitions in the cylinder dividing each compartment into two chambers; two check valves, the relief side of one being connected to three alternate chambers, and the relief side of the other valve communicatiing with the other three alternate chambers, the pressure side of the one check-valve communicating with the said other three alternate chambers and the pressure side of the second mentioned check-valve being connected with the first mentioned three alternate chambers.

12. In a device of the character described, the combination with a casing providing a cylinder; a piston within said cylinder dividing it into three compartments; stationary partitions in the cylinder dividing each compartment into two chambers; two check-valves; means connecting the relief sides of the check-valves with respective, adjacent chambers, separated by a partition; ducts in the piston, each communicating with the pressure side of a respective check-valve; a channel in the piston connecting each duct with the chamber communicating with the relief side of the other check-valve; and channels in the piston connecting alternate chambers with the ducts.

13. A double-acting shock absorber comprising, in combination, a casing presenting a cylinder; partitions in said cylinder; a piston in said cylinder cooperating with the partitions to provide alternate "compression check" and "rebound check" chambers; ducts in said piston; channels in said piston connecting all "compression check" chambers with one duct and all "rebound check" chambers with the other duct; two check-valves; ducts connecting the relief sides of the respective check-valves with a "compression check" and "rebound check" chamber respectively; and channels in the casing connecting the pressure side of each respective check-valve with the duct in the piston in communication with the relief side of the other valve.

14. A double-acting shock absorber comprising, in combination, a casing presenting a cylinder; partitions in said cylinder; a piston in said cylinder cooperating with the partitions to provide alternate "compression check" and "rebound check" chambers; means separately connecting all of the "compression check" and all of the "rebound check" chambers respectively; connecting means providing communication between a chamber of one group and the means separately connecting all of the chambers of the other group; and a check valve in said connecting means.

15. A double-acting shock absorber comprising, in combination, a casing presenting a cylinder; a piston in said cylinder, said piston comprising a hub portion rotatably supported by the casing coaxial of the cylinder, the hub having vanes extending therefrom which divide the cylinder into three compartments; partition members carried within the cylinder, each member dividing a compartment into two chambers; ducts in the hub of the piston separately connecting alternate chambers; a passage in the casing connecting one chamber of a group of alternate chambers with the duct connecting all of the other alternate chambers; a second passage in the casing connecting one chamber of the second mentioned group of alternate chambers with the connecting duct of the first mentioned group of chambers; and a one-way check valve in each of said passages.

16. A double-acting shock absorber comprising, in combination, a casing presenting a cylinder; a piston in said cylinder, said piston comprising a hub having equally spaced, radial vanes dividing the cylinder into three compartments; a partition plate in the cylinder, having provisions for rotatably supporting the piston hub, said plate also forming one side wall for the cylinder compartments; partition members supported by the casing within the cylinder compartments and dividing each compartment into a "compression check" and a "rebound check" chamber; passages in the hub of the piston separately connecting all the "compression check" and all the "rebound check" chambers, two check-valves supported in the casing, the relief sides of the check-valves being connected with respective "rebound check" and "compression check" chambers, the pressure sides of the respective check-valves being connected to the chambers in communication with the relief side of the adjacent relative valve.

17. A double-acting shock absorber comprising, in combination, a cylinder; a partition wall forming a working chamber in said cylinder; a piston rotatably journalled in said partition wall and having a hub extending into the working chamber; three equally spaced, radial vanes provided by said hub, said vanes dividing the working chamber into three compartments; partition lugs provided within the working chamber, each lug dividing a respective compartment into two chambers; means provided by the piston for separately connecting all alternate chambers; and one-way valves providing for the transfer of fluid from one group of alternate chambers into the other group of alternate chambers in response to the movement of the piston in one direction, and from the said other group of chambers to the first mentioned group of chambers in response to the movement of the piston in the other direction.

18. A double-acting shock absorber comprising, in combination, a casing presenting a cylinder; a piston rotatably supported within said cylinder, said piston having radial vanes dividing the cylinder into compartments; partition members rigidly supported within the cylinder, each partition member dividing a compartment into two chambers; means provided by the piston for separately connecting all alternate chambers; channels in the casing, each separately connecting a chamber of one group with the means separately connecting all of the other alternate chambers; a check valve in each of said channels; a passage in the one partition member providing communication between the chambers on each side thereof; and means accessible from outside the shock absorber for varying the fluid flow capacity of said passage.

19. A shock absorber comprising, in combination, a casing presenting a cylinder; a piston in said cylinder dividing it into compartments; ducts in the piston; ducts in the casing cooperating with the ducts in the piston to provide communication between the compartments; and check valves in said ducts adapted to establish flows of fluid between said compartments in opposite directions respectively.

20. A shock absorber comprising, in combination, a casing providing a cylinder; a partition in said cylinder; a piston in said cylinder forming compression chambers on each side of said partition; ducts in the piston; ducts in the casing cooperating with the ducts in the piston to provide communication between the compression chambers; and a check valve in each of the casing ducts, one check valve establishing a restricted flow of fluid in one direction between the compression chambers, the other check valve establishing a restricted flow of fluid in the opposite direction between the compression chambers.

21. A shock absorber comprising, in combination, a casing providing a cylinder; a piston in said cylinder dividing the casing into a plurality of compartments; partitions supported by the casing, each dividing a compartment into two chambers; separate groups of communicating ducts in the piston, each group of ducts inter-connecting alternate chambers; ducts in the casing connecting one chamber of a group of alternate chambers with a group of ducts in the piston inter-connecting the other group of alternate chambers; and spring-loaded check valves in the ducts of the casing.

22. A shock absorber comprising, in combination, a casing providing a cylinder; a piston in said cylinder dividing the casing into a plurality of compartments; partitions supported by the casing, each dividing a compartment into two chambers; ducts in the piston separately providing communication between alternate chambers; ducts in the casing connecting one chamber with the ducts in the piston inter-connecting the chambers next adjacent thereto; and a check valve in each duct in the casing, adapted to establish a restricted flow of fluid from the ducts in the piston to the chamber with which the casing duct communicates, said check valve, however, completely shutting off fluid flow from said chamber to said piston ducts.

In testimony whereof I hereto affix my signature.

WILLIAM A. CHRYST.